(12) United States Patent (10) Patent No.: US 9,042,259 B2
Jung et al. (45) Date of Patent: May 26, 2015

(54) METHOD FOR MEASURING IN WIRELESS COMMUNICATION SYSTEM AND APPARATUS FOR SUPPORTING SAME

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 13/882,716

(22) PCT Filed: Nov. 1, 2011

(86) PCT No.: PCT/KR2011/008259
§ 371 (c)(1),
(2), (4) Date: Apr. 30, 2013

(87) PCT Pub. No.: WO2012/060614
PCT Pub. Date: May 10, 2012

(65) Prior Publication Data
US 2013/0223268 A1   Aug. 29, 2013

Related U.S. Application Data

(60) Provisional application No. 61/409,072, filed on Nov. 1, 2010.

(51) Int. Cl.
| | | |
|---|---|---|
| H04L 12/801 | (2013.01) | |
| H04L 12/26 | (2006.01) | |
| H04W 80/04 | (2009.01) | |
| H04W 88/06 | (2009.01) | |
| H04W 28/04 | (2009.01) | |
| H04W 72/04 | (2009.01) | |
| H04W 24/10 | (2009.01) | |
| H04J 11/00 | (2006.01) | |
| H04W 72/08 | (2009.01) | |
| H04W 24/02 | (2009.01) | |

(52) U.S. Cl.
CPC ............. H04W 24/10 (2013.01); H04J 11/005 (2013.01); H04W 24/02 (2013.01); H04W 72/082 (2013.01); H04J 2211/001 (2013.01)

(58) Field of Classification Search
CPC ....... H04L 47/10; H04L 43/50; H04W 80/04; H04W 88/06; H04W 28/04; H04W 72/04
USPC .......................................... 370/252, 328, 329
See application file for complete search history.

(56) References Cited

U.S. PATENT DOCUMENTS

| | | |
|---|---|---|
| 2007/0105561 A1 | 5/2007 | Doetsch et al. |
| 2008/0161033 A1 | 7/2008 | Borran et al. |
| 2010/0322202 A1* | 12/2010 | Ohta ............................. 370/336 |
| 2011/0275394 A1* | 11/2011 | Song et al. .................... 455/509 |

* cited by examiner

*Primary Examiner* — Ronald B Abelson
(74) *Attorney, Agent, or Firm* — Lee, Hong, Degerman, Kang & Waimey

(57) ABSTRACT

Provided is a method for measuring which is performed by a user equipment in a wireless communication system. The method comprises the following steps: receiving from a serving cell an interference area indication setting including information which permits the user equipment to transmit the interference area indication; deciding whether a limited measurement is necessary; and transmitting the interference area indication for indicating that the limited measurement is necessary to the serving cell, receiving a limited resource measurement setting as a reply to the interference area indication, and performing the measurement based on the limited resource measurement setting, when the limited measurement is decided as necessary.

14 Claims, 12 Drawing Sheets

METHOD FOR MEASURING IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2011/008259, filed on Nov. 1, 2011, which claims the benefit of U.S. Provisional Application Ser. No. 61/409,072, filed on Nov. 1, 2010, the contents of which are all hereby incorporated by reference herein in their entirety.

TECHNICAL FIELD

The present invention concerns to wireless communications, and more specifically, to a measurement method of allowing interference to be avoided by receiving a restricted measurement configuration from a serving cell and a neighboring cell and reporting the restricted measurement configuration to the serving cell and an apparatus supporting the same.

BACKGROUND ART

3$^{rd}$ Generation Partnership Project (3GPP) Long Term Evolution (LTE), an evolution of UMTS (Universal Mobile Telecommunications System), is introduced as 3GPP release 8. 3GPP LTE adopts Orthogonal Frequency Division Multiple Access (OFDMA) for downlink and Single Carrier-Frequency Division Multiple Access (SC-FDMA) for uplink. Multiple Input Multiple Output (MIMO) is employed of having up to four antennas. Recently, an advanced version of 3GPP LTE, 3GPP LTE-advanced (LTE-A), is actively on discussion.

User equipment (UE), while being serviced from a specific cell, may be interfered by radio signals transmitted from another cell. User equipment periodically measures cells and reports a measurement result. In case user equipment performs handover to another cell, it may perform measurement on a neighboring cell as well as a serving cell and may report a result. In measuring the specific cell, interference caused by radio signals from other cells renders it difficult for the user equipment to normally measure the specific cell. This deteriorates mobility of the user equipment in the wireless communication system.

In particular, under the situation where macro cells, pico cells, and femto cells are co-existent, for example, when different service coverage, different frequency channel bands, and different RATs (Radio Access Technologies) serviced by cells, schemes for avoiding interference caused by the cells may be considered more critical.

Inter-cell Interference Coordination (ICIC) is a task that operates radio resources so as to maintain control of inter-cell interference. The ICIC mechanism may be divided into a frequency domain ICIC and a time domain ICIC. The ICIC includes multi-cell Radio Resource Management (RRM) functions that require consideration of information from multi-cells.

The frequency domain ICIC coordinates use of frequency domain resources (e.g., Resource Block (RB)) between multi-cells. The time domain ICIC coordinates time domain resources (e.g., subframe) between multi-cells.

In the ICIC, depending on targets for which the user equipment performs measurement, targets causing interference (i.e., interfering cell) and targets damaged by interference (i.e., interfered cell) are determined.

If user equipment approaches the coverage of a neighboring cell that cannot be accessed, the user equipment may be highly interfered. To prevent the situation where UEs inaccessible to the neighboring cell cannot perform communication due to interference caused by the neighboring cell, the neighboring cell may transmit and receive wireless signal transmission signals with measurement resources limited.

Meanwhile, the serving cell of the user equipment may not be aware of measurement resource restriction information applied by the inaccessible neighboring cell. In such case, the serving cell may not apply the measurement resource restriction configuration to the user equipment. To address such problems, there is a need for a method in which the user equipment obtains measurement resource restriction information applied by the neighboring cell and reports the measurement resource restriction information to the serving cell and then performs restricted measurement based on the information.

DISCLOSURE

Technical Problem

An object of the present invention is to provide a method of avoiding interference from a serving cell and a neighboring cell in a wireless communication system, specifically, a method in which user equipment obtains a measurement resource restriction configuration from an interfering cell and reports the configuration to the serving cell so that measurement may be performed based on the configuration and an apparatus supporting the method.

Technical Solution

In an aspect, a method of performing measurement by user equipment in a wireless communication system is provided. The method comprises receiving, from a serving cell, an interference area indication configuration including information allowing transmission of an interference area indication of the user equipment, determining whether restricted measurement is required, when the restricted measurement is determined to be required, transmitting, to the serving cell, an interference area indication indicating that the restricted measurement is required, receiving a measurement resource restriction configuration in response to the interference area indication, and performing measurement based on the measurement resource restriction configuration.

The method may further comprise finding an interfering cell and obtaining interference area information relating to the interfering cell.

The interfering cell may configure and operate a low-interference radio resource to transmit and receive a radio signal.

The low-interference radio resource may include pattern information of an ABS (Almost Blank Subframe) that is operated by the interfering cell and that is a section where interference is minimized.

The interference area information may include the ABS pattern information.

The interference area indication may include at least one of information on an interfered cell that is an object of the restricted measurement and information on the interfering cell.

The information on the interfering cell may include information indicating a case where the interfering cell is inaccessible and the ABS pattern information.

The measurement resource restriction configuration may include the ABS pattern information, and performing measurement based on the measurement resource restriction configuration may include performing the restricted measurement based on the ABS pattern information.

The interference area information may include a cell identity of the interfering cell, and when detecting a cell having the same identity as the cell identity, determining that the restricted measurement is required.

The interference area information may include locational information indicating a position of the user equipment when the interfering cell is detected, and if after the interference area information is obtained, the position of the user equipment is within a predetermined range from a position indicated by the positional information, determining that the restricted measurement is required.

The interference area indication configuration may include at least one of indication criterion information that is a reference for determining a situation where high interference occurs and information on an area where the restricted measurement is required.

If the user equipment is positioned in the area where the restricted measurement is required, it may be determined that the restricted measurement is required.

If the occurrence of the high interference is detected based on the indication criterion information, it is determined that the restricted measurement is required.

The serving cell may configure and operate a low-interference radio resource to transmit and receive a radio signal.

The low-interference radio resource may include pattern information of an ABS (Almost Blank Subframe) that is operated by the serving cell and that is a section where interference is minimized.

The interference area indication may include information on the interfering cell.

The information on the interfering cell may include information indicating that the interfering cell is the serving cell.

The measurement resource restriction configuration may include the ABS pattern information, and performing measurement based on the measurement resource restriction configuration may include performing the restricted measurement based on the ABS pattern information.

In another aspect, an apparatus of performing measurement in a wireless communication system is provided. The apparatus comprises an RF (Radio Frequency) unit transmitting and receiving a radio signal and a processor connected to the RF unit, the processor receives, from a serving cell, an interference area indication configuration including information that is a reference for determining whether restricted measurement is required, determining whether the restricted measurement is required based on the interference area indication configuration, when the restricted measurement is determined to be required, transmitting, to the serving cell, an interference area indication indicating that the restricted measurement is required, receiving a measurement resource restriction configuration in response to the interference area indication, and performing measurement based on the measurement resource restriction configuration.

The processor may find an interfering cell and obtain interference area information by the interfering cell, and the interference area information may include pattern information of an ABS (Almost Blank Subframe) that is operated by the interfering cell and that is a section where interference is minimized.

The interference area indication may include at least one of information on an interfered cell that is an object of the restricted measurement and information on the interfering cell.

The information on the interfering cell may include information indicating a case where the interfering cell is inaccessible and the ABS pattern information.

The measurement resource restriction configuration may include the ABS pattern information, and performing measurement based on the measurement resource restriction configuration may include performing the restricted measurement based on the ABS pattern information.

The information on the interfering cell may include information indicating that the interfering cell is the serving cell and pattern information of an ABS (Almost Blank Subframe) that is operated by the interfering cell and that is a section where interference is minimized.

The measurement resource restriction configuration may include the ABS pattern information, and performing measurement based on the measurement resource restriction configuration may include performing the restricted measurement based on the ABS pattern information.

Advantageous Effects

In a restricted measurement method performed by the user equipment, the user equipment determines whether to need restricted measurement and informs it to the serving cell. The user equipment conducts restricted measurement on the serving cell and neighboring cell based on the measurement resource restriction configuration transmitted from the network.

In case the serving cell does not contain the measurement resource restriction information applied to the neighboring cell and thus fails to provide the corresponding information to the user equipment, the user equipment may obtain measurement resource restriction information including low-interference radio resource information from the neighboring cell by measurement and may report it to the serving cell. By doing so, the serving cell may apply a proper low-interference radio resource to the user equipment, and the user equipment may conduct restricted measurement based on the radio resource.

The user equipment, as necessary, may determine what kind of information is needed for measurement resource restriction configuration and may directly obtain it and provide it to the serving cell, which enables the serving cell to effectively apply the measurement resource restriction configuration to the user equipment. The user equipment may receive, on time, the efficient measurement resource restriction configuration from the serving cell, thus resulting in high-accuracy measurement result being reported, together with an enhancement in service provided to the user equipment.

MODE FOR INVENTION

Figure 1:
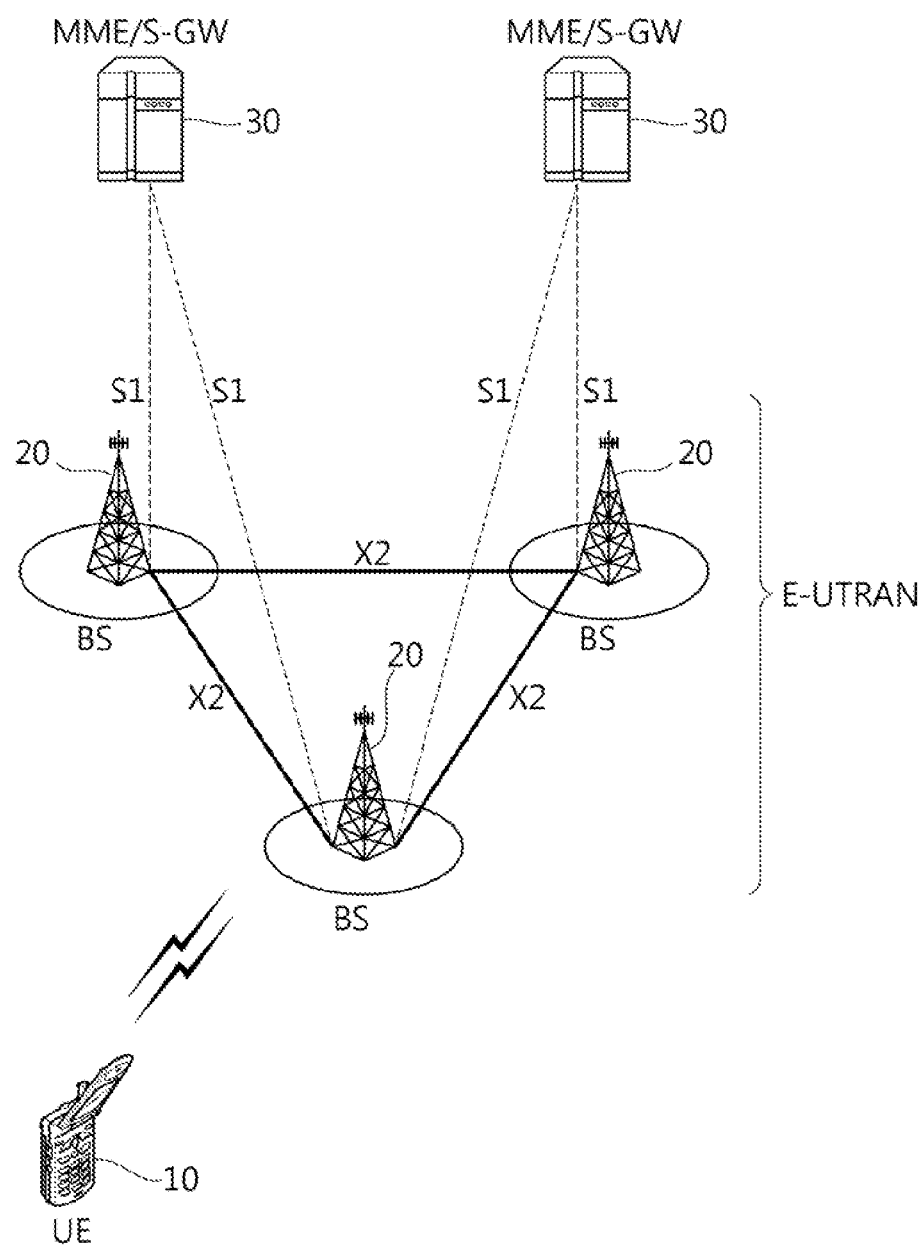
FIG. 1 shows a wireless communication system according to the present invention.

FIG. 1 shows a wireless communication system according to the present invention. This system may be also referred to as Evolved-UMTS Terrestrial Radio Access Network (E-UTRAN) or Long Term Evolution (LTE)/LTE-A system.

The E-UTRAN includes a base station (BS) 20 providing a control plane and a user plane to user equipment (UE) 10. The user equipment 10 may be stationary or mobile and may be also referred to by other terms such as Mobile Station (MS), User Terminal (UT), Subscriber Station (SS), Mobile Terminal (MT), or wireless device. The base station 20 is a fixed station communicating with the user equipment 10 and may be referred to by other terms such as evolved-NodeB (eNB), Base Transceiver System (BTS), or access point.

The base stations 20 may be connected to each other through an $X_2$ interface. The base station 20 is connected to an Evolved Packet Core (EPC) 30 through an S1 interface, more specifically, to an Mobility Management Entity (MME) through an S1-MME and to an Serving Gateway (S-GW) through S1-U.

The EPC 30 consists of an MME, an S-GW, and a Packet Data Network-Gateway (P-GW). The MME has access information of the user equipment or information on the capacity of the user equipment. Such information is mainly used for managing mobility of the user equipment. The S-GW is a gateway having E-UTRAN as its end point, and the P-GW is a gateway having PDN as its end point.

Layers of a radio interface protocol between the user equipment and the network may be divided into an L1 (first layer), an L2 (second layer), and an L3 (third layer) based on lower three layers of an open system interconnection (OSI) reference model well known in the communication system. Among them, the physical layer, which belongs to the first layer, provides an information transfer service using a physical channel, and the Radio Resource Control (RRC) layer positioned in the third layer controls radio resources between the user equipment and the network. For this, the RRC layer exchanges RRC messages between the user equipment and the base station.

Figure 2:
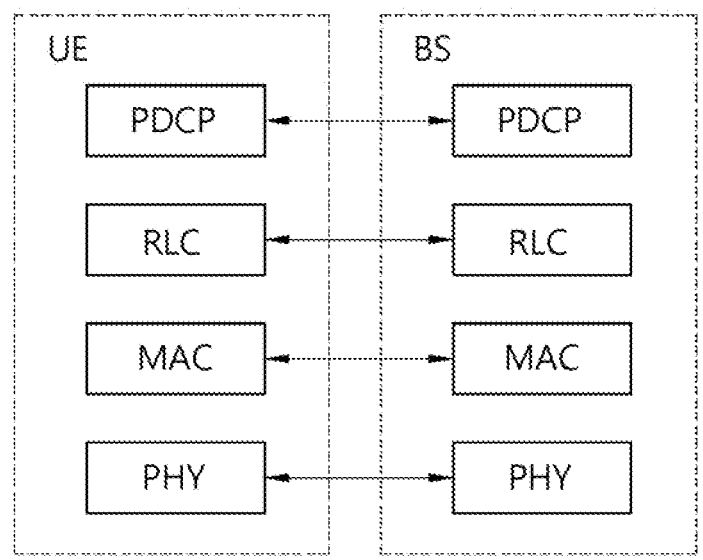
FIG. 2 is a block diagram illustrating a radio protocol architecture for a user plane.
Figure 3:
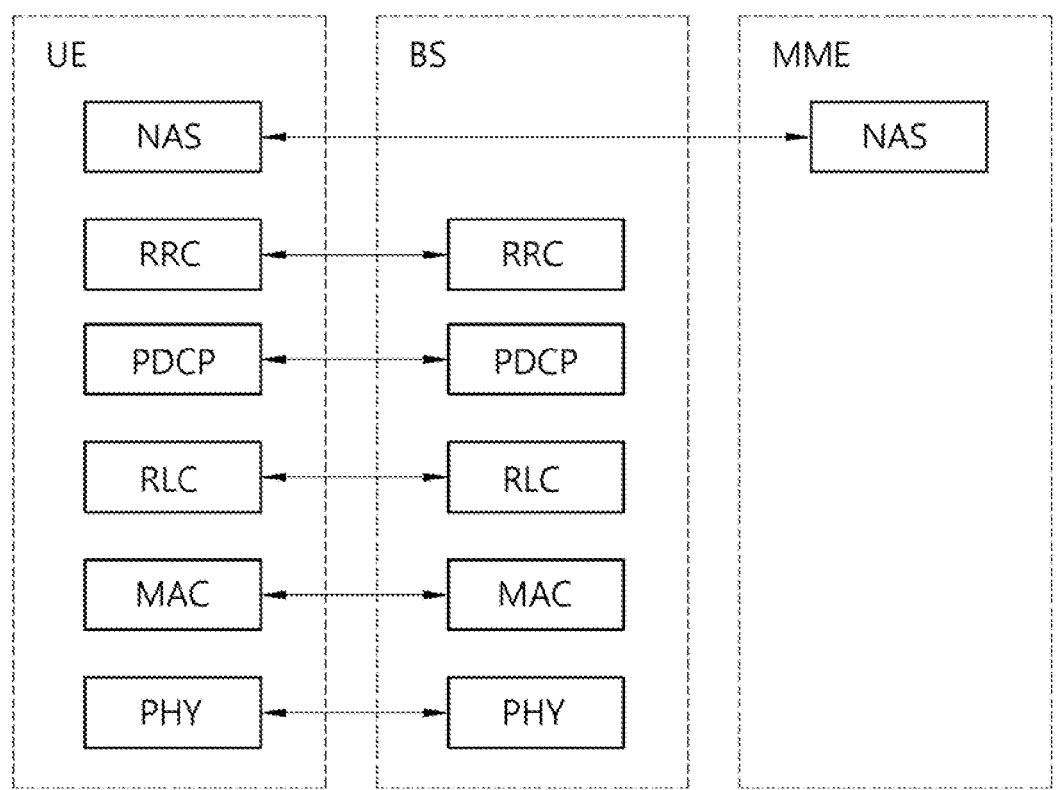
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The data plane is a protocol stack for user data transmission, and the control plane is a protocol stack for control signal transmission.

Referring to FIGS. 2 and 3, the physical (PHY) layer provides an information transfer service to an upper layer using a physical channel. The physical channel is connected to an Medium Access Control (MAC) channel, an upper layer, via a transport channel. Data flows between the MAC layer and the physical layer through the transport channel. The transport channel is divided depending on characteristics in which data is transmitted through a radio interface.

Data flows through the physical channel between different physical layers, i.e., between the physical layer of a transmitter and the physical layer of a receiver. The physical channel may be modulated in the Orthogonal Frequency Division Multiplexing (OFDM) scheme and uses time and frequency as radio resources.

The functions of the MAC layer include mapping between the logical channel and the transport channel and multiplexing/de-multiplexing to a transport block provided through the physical channel over the transport channel of an MAC Service Data Unit (SDU) belonging to the logical channel. The MAC layer provides services to the Radio Link Control (RLC) layer through the logical channel.

The functions of the RLC layer include concatenation, segmentation and reassembly of the RLC SDU. To guarantee various Quality of Service (QoS) demanded by a radio bearer (RB), the RLC layer provides three operation modes including a transparent mode (TM), an unacknowledged mode (UM), and an acknowledged mode (AM). The AM RLC corrects errors through an Automatic Repeat Request (ARQ).

In the user plane, the functions of the PDCP (Packet Data Convergence Protocol) layer include transfer of user data, header compression, and ciphering. In the user plane, the functions of the Packet Data Convergence Protocol (PDCP) layer include transfer, and ciphering/integrity protection of the control plane data.

The Radio Resource Control (RRC) layer is defined only in the control plane. The RRC layer is associated with configuration, re-configuration, and release of radio bearers (RBs) and is in charge of control of the logical channel, transport channel, and physical channel. The RB means a logical path provided by the first layer (PHY layer) and the second layer (MAC layer, RLC layer, and PDCP layer) for data transfer between the user equipment and the network.

RB being configured means a process of specifying the characteristics of the radio protocol layer and channel and configuring each specific parameter and operation method so as to provide a specific service. The RB may be divided into two including an Signaling RB (SRB) and a Data RB (DRB). The SRB is used as a path for transmitting an RRC message on the control plane, and the DRB is used as a path for transmitting user data on the user plane.

If an RRC connection is established between the user equipment's RRC layer and the E-UTRAN's RRC layer, the user equipment is left in the RRC connected state, and the user equipment otherwise remains in the RRC idle state.

Downlink transport channels transmitting data from the network to the user equipment include a Broadcast Channel (BCH) transmitting system information and a downlink Shared Channel (SCH) transmitting other user traffic or control messages. Downlink multicast or broadcast service traffic or control messages may be transmitted through the downlink SCH or through a separate downlink Multicast Channel (MCH). Meanwhile, uplink transport channels transmitting data from the user equipment to the network include an Random Access Channel (RACH) transmitting initial control messages and an uplink Shared Channel (SCH) transmitting other user traffic or control messages.

As logical channels that are positioned over the transport channel and that are mapped to the transport channel, there are Broadcast Control Channel (BCCH), Paging Control Channel (PCCH), Common Control Channel (CCCH), Multicast Control Channel (MCCH), and Multicast Traffic Channel (MTCH).

The physical channel consists of several OFDM symbols in the time domain and a few sub-carriers in the frequency domain. One sub-frame is constituted of a plurality of OFDM symbols in the time domain. The resource block is a basis for resource allocation and consists of a plurality of OFDM symbols and a plurality of sub-carriers. Further, each sub-frame may use specific sub-carriers of specific OFDM symbols (e.g., first OFDM symbol) of the corresponding sub-frame for Physical Downlink Control Channel (PDCCH), i.e., L1/L2 control channel. Transmission Time Interval (TTI) is a basis time for sub-frame transmission.

An RRC state and an RRC connecting method of user equipment are hereinafter described in detail.

The RRC state means whether the RRC layer of user equipment is in logical connection with the RRC layer of E-UTRAN, and when connected, it is referred to as being in the RRC connected state, or unless connected, it is referred to as being in the RRC idle state. Since in the RRC connected state the user equipment has an RRC connection, E-UTRAN may grasp the existence of the corresponding user equipment on a per-cell basis and accordingly may effectively control the user equipment. On the contrary, the user equipment, when being in the RRC idle state, may not be grasped by E-UTRAN and is managed by a CN (Core Network) on the basis of a tracking area that is larger in area than the cell. That is, when the user equipment is in the RRC idle state, what is grasped on the user equipment is only whether the user equipment is existent or not on a per-large area basis, and for normal mobile services such as voice or data service to be provided, shift should be done to the RRC connected state.

When a user first powers on the user equipment, the user equipment initially explores a proper cell and then stays in the RRC idle state in the corresponding cell. The user equipment being in the RRC idle state establishes an RRC connection with the E-UTRAN through an RRC connection procedure when the user equipment needs to make an RRC connection and shifts to the RRC connected state. Examples of when the user equipment being in the RRC idle state needs to make an RRC connection include when uplink data transmission is required, e.g., due to a user's attempt to call or when transmitting a response message in response to receiving a paging message from the E-UTRAN.

The Non-Access Stratum (NAS) layer positioned over the RRC layer performs functions such as session management and mobility management.

To manage mobility of the user equipment in the NAS layer, two states, EPS Mobility Management-REGISTERED (EMM-REGISTERED) and EMM-DEREGISTERED, are defined, and these two states apply to the user equipment and the MME. Initially, the user equipment is in the EMM-DEREGISTERED state, and the user equipment performs a process of registering itself to the corresponding network through an initial attaching procedure so as to be attached to the network. If the attaching procedure is successfully done, the user equipment and the MME turn into the EMM-REGISTERED state.

To manage signaling connection between the user equipment and the EPC, two states, EPS Connection Management (ECM)-IDLE state and ECM-CONNECTED state, are defined, and these two states apply to the user equipment and the MME. If the user equipment being in the ECM-IDLE state establishes an RRC connection with the E-UTRAN, the corresponding user equipment turns into the ECM-CONNECTED state. The MME being in the ECM-IDLE state, when establishing an S1 connection with the E-UTRAN, turns into the ECM-CONNECTED state. When the user equipment is left in the ECM-IDLE state, the E-UTRAN does not contain context information of the user equipment. Accordingly, the user equipment being in the ECM-IDLE state performs user equipment-based mobility-related procedure such as cell selection or cell reselection without the need of receiving a command from the network. In contrast, when the user equipment is left in the ECM-CONNECTED state, the user equipment's mobility is managed by a command from the network. In case the position of the user equipment when the user equipment is in the ECM-IDLE state is different from the position known to the network, the user equipment informs the position of the user equipment to the network through a tracking area update process.

Next, system information is described.

The system information includes necessary information of which the user equipment should be aware to access the base station. Accordingly, the user equipment should be receiving the whole system information before gaining access to the base station and should always have the up-to-date system information. The system information should be known to all user equipment in one cell, and thus, the base station periodically transmits the system information.

According to chapter 5.2.2. 3GPP TS 36.331 V8.7.0 (2009-09) "Radio Resource Control (RRC); Protocol specification (Release 8)", the system information is divided into Master Information Block (MIB), Scheduling Block (SB), and System Information Block (SIB). MIB allows the user equipment to be aware of physical configuration of the corresponding cell, for example, bandwidth. SB indicates transmission information of SIBs, for example, transmission period. SIB is an aggregate of system information relating to each other. For example, some SIB includes only information on the neighboring cell, and some SIB contains only information on the uplink radio channel used by the user equipment.

In general, services provided from the network to the user equipment may be classified into three types as follows. Further, depending on what services may be provided, the user equipment differently recognizes the type of cell. Service types are first described, followed by cell types.

1) limited service: this service provides an emergency call and an earthquake and Tsunami warning system (ETWS) and may provide it in an acceptable cell.

2) normal service: this service means a general purpose of public service and may be provided from a suitable or normal cell.

3) operator service: this service means a service for communication network service providers and this cell may be used only by a communication network service provider but not by a general user.

In connection with service types provided by cells, cell types may be classified as follows:

1) acceptable cell: cell in which the user equipment may receive limited services. This cell is not barred in the position of the corresponding user equipment and satisfies a cell selection standard of the user equipment.

2) suitable cell: cell in which the user equipment may receive a normal service. This cell satisfies conditions of the acceptable cell and simultaneously meets additional conditions. As the additional conditions, this cell should belong to Public Land Mobile Network (PLMN) to which the corresponding user equipment may be attached and the tracking area update process of the user equipment should not be barred from being carried out. If the corresponding cell is a CSG cell, the cell should be accessible cell to which the user equipment can access as a CSG member.

3) barred cell: this cell broadcasts information that the cell is a barred cell.

4) reserved cell: this cell broadcasts information that the cell is a reserved cell.

Measurement and measurement report are now described.

In the mobile communication system, supporting mobility by the user equipment is essential. Accordingly, the user equipment continuously measures the quality of a serving cell currently providing a service and the quality of a neighboring cell. The user equipment reports a measurement result to the network at a proper time and the network provides the optimal mobility to the user equipment through handover.

The user equipment, in order to provide information that may help a service provider to operate the network besides the purpose of supporting mobility, may perform a measurement of a specific purpose as configured by the network and may report a measurement result to the network. For example, the user equipment receives broadcast information of a specific cell determined by the network. The user equipment may report, to the serving cell, position identification information (e.g., tracking area code) of the position to which the specific cell belongs, and/or other cell information (e.g., whether Closed Subscriber Group (CSG) cell is a member).

The user equipment being on the move, when identifying through the measurement that the quality of a specific area is very poor, may report to the network the position information for the cells of poor quality and the measurement result. The network may be optimized based on the report of the measurement result of user equipment that helps operation of the network.

In a mobile communication system with a frequency reuse factor of 1, mobility is mostly achieved between different cells on the same frequency band. Accordingly, for insuring better mobility of the user equipment, the user equipment should be able to measure better the cell information and quality of neighboring cells having the same center frequency as the center frequency of the serving cell. As such, measurement on the cells having the same center frequency as the center frequency of the serving cell is referred to as intra-cell measurement. The user equipment performs the intra-cell measurement and reports a measurement result to the network at a proper time so that the goal of the corresponding measurement result may be achieved.

A mobile communication service provider may operate the network using a plurality of frequency bands. In case a communication system service is provided through a plurality of frequency bands, the user equipment should be able to conduct better measurement on the cell information and quality of neighboring cells having center frequencies different from the center frequency of the serving cell so as to guarantee the optimal mobility for the user equipment. As such, the measurement on cells having a different center frequency from the center frequency of the serving cell is referred to as inter-cell measurement. The user equipment should be able to perform the inter-cell measurement and should be able to report a measurement result to the network at a proper time.

In case the user equipment applies for measurement on a heterogeneous network, it may also conduct measurement on a cell in the heterogeneous network in accordance with a configuration of the base station. Such measurement on the heterogeneous network is referred to as inter-Radio Access Technology (RAT) measurement. For example, RAT may include UMTS Terrestrial Radio Access Network (UTRAN) and GSM EDGE Radio Access Network (GERAN) that follow the 3GPP standards and may also include CDMA2000 system following the 3GPP2 standards.

Hereinafter, a process of selecting a cell by the user equipment is described in detail with reference to 3GPP TS 36.304 V8.8.0 (2009-12) "User Equipment (UE) procedures in idle mode (Release 8)".

After the user equipment once selects some cell through a cell selection process, the strength or quality of signals between the user equipment and the base station may vary due to a change in mobility of the user equipment or radio environment. Accordingly, in case the quality of the selected cell is deteriorated, the user equipment may select another cell providing better quality. When selecting a cell again, the user equipment generally selects a cell providing better signal quality than that provided by the currently selected cell. Such process is referred to as cell reselection. The cell reselection process, in the point of view of quality of radio signals, basically aims to choose a cell providing the best quality to the user equipment.

Besides the point of view of quality of radio signals, the network may determine a priority per frequency and may provide the priority to the user equipment. The user equipment receives the priority and considers the priority in preference to the radio signal quality condition in the cell reselection process.

As such, there is a method of selecting or reselecting a cell depending on signal characteristics in the radio environment, and in selecting a cell for reselection when doing cell reselection, the following cell reselection methods may be present according to the RAT of the cell and frequency characteristics.

intra-frequency cell reselection: reselects a cell having the same center frequency and the same RAT as a cell where the user equipment is camping.

inter-frequency cell reselection: reselects a cell having the same RAT and a different center frequency from a cell where the user equipment is camping.

inter-RAT cell reselection: reselects a cell using a RAT different from a RAT where the user equipment is camping.

The cell reselection process is as follows.

First, the user equipment receives a parameter for cell reselection from the base station.

Second, the user equipment measures quality of a serving cell and a neighboring cell to make the cell reselection.

Third, the cell reselection is performed based on cell reselection criteria. The cell reselection criteria have the following characteristics in relation to the measurement of the serving cell and the neighboring cell.

The intra-frequency cell reselection is basically based on ranking. The "ranking" is a process of defining index values for evaluating cell reselection and numbering the cells according to size of the index values. The cell having the best index is often called "best ranked cell." Cell index values are values obtained by, as necessary, applying a frequency offset or cell offset to values measured on the corresponding cell by the user equipment.

The inter-frequency cell reselection is based on the frequency priority order provided by the network. The user equipment attempts to camp on the frequency having the highest frequency priority. The network provides a frequency priority order that is jointly applicable to all the user equipment in the cell through broadcast signaling and may provide a per-frequency priority to each user equipment through per-user equipment signaling (dedicated signaling).

For the inter-frequency cell reselection, the network may provide parameters (e.g., frequency-specific offset) used for cell reselection to the user equipment per frequency.

For the intra-frequency cell reselection or inter-frequency cell reselection, the network may provide the user equipment with a neighboring cell list (NCL) used for cell reselection. This NCL includes per-cell parameters (for example, cell-specific offset) used for cell reselection.

For the intra-frequency or inter-frequency cell reselection, the network may provide the user equipment with a cell reselection black list used for cell reselection. The user equipment may not perform cell reselection on the cells included in the black list.

Subsequently, ranking which is done during the course of cell reselection evaluation is described.

The ranking criterion used to provide a priority of a cell is defined in Equation 1:

$$R_s = Q_{meas,s} + Q_{hyst}, R_n = Q_{meas,n} - Q_{offset} \quad \text{[Equation 1]}$$

Here, Rs is a ranking criterion of a serving cell, Rn a ranking criterion of a neighboring cell, Qmeas,s a quality value measured on a serving cell by the user equipment, Qmeas,n a quality value measured on a neighboring cell by the user equipment, Qhyst a hysteresis value for ranking, and Qoffset an offset value between two cells.

In case of intra-frequency, when the user equipment receives an offset (Qoffset,n) between the serving cell and the neighboring cell, Qffoset=Qoffsets,n. And, when the user equipment does not receive Qoffsets,n, Qoffset=0.

In case of inter-frequency, when the user equipment receives an offset (Qoffsets,n) for the corresponding cell, Qoffset=Qoffsets,n+Qfrequency. And, when the user equipment does not receives Qoffsets,n, Qoffset=Qfrequency.

If the ranking criterion (Rs) of the serving cell and the ranking criterion (Rn) of the neighboring cell vary while they are similar to each other, such variation causes the ranking order to keep changing, so that the user equipment may alternately reselect the two cells. Qhyst is a parameter that provides a hysteresis in cell reselection to prevent the user equipment from making alternate reselection on the two cells.

The user equipment measures Rs of the serving cell and Rn of the neighboring cell according to the above equation and considers the cell having the largest ranking criterion value as the best ranked cell, reselecting this cell.

The above criteria show that the cell quality acts as the most critical criterion in cell reselection. If the reselected cell is not a suitable cell, the user equipment excludes the corresponding frequency or cell from the targets for cell reselection.

Serving cells may be divided into a primary cell and a secondary cell. The primary cell is a cell that operates at a primary frequency, performs an initial connection establishing process of user equipment, or initiates a connection reestablishing process or is a cell designated as the primary cell during the course of handover. The primary cell is also referred to as reference cell. The secondary cell operates at a secondary frequency, may be configured after RRC connection is established, and may be used to provide an additional radio resource. At least one primary cell is always set, and a secondary cell may be added/modified/released by upper layer signaling (e.g., RRC message).

The radio link failure is now described.

The user equipment continues to perform measurement so as to maintain the quality of a radio link with a serving cell providing a service to the user equipment. The user equipment determines whether the quality of the radio link with the serving cell is weakened so that communication is impossible. If it is determined that the quality of the current serving cell is too poor to allow communication to be continued, the user equipment determines that the radio link fails.

If it is determined that the radio link failures occurs, the user equipment gives up maintaining communication with the current serving cell, selects a new cell through cell selection (or cell reselection), and attempts to reestablish an RRC connection to the new cell.

Figure 4:
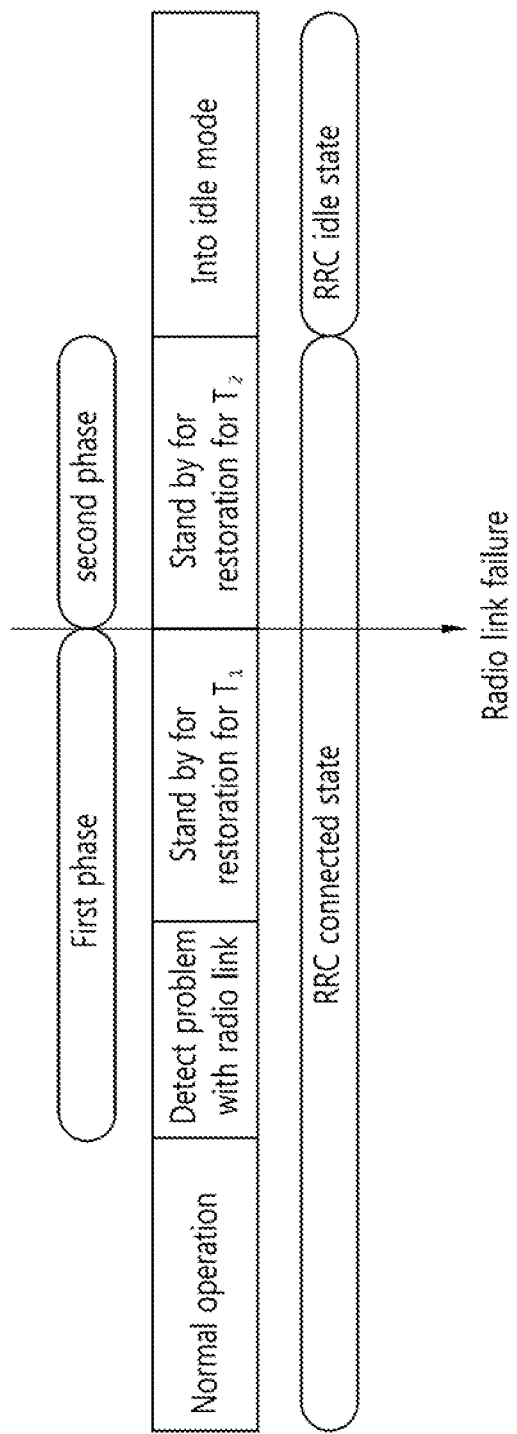
FIG. 4 is a view illustrating an example of a radio link failure.

FIG. 4 is a view illustrating an example of a radio link failure. The operation associated with the radio link failure may be described in two phases.

In the first phase, the user equipment normally operates and examines whether there is a problem with the current communication link. If a problem is detected, the user equipment declares "radio link problem" and stands by for first wait time T1 until the radio link is recovered. If the radio link is recovered before first wait time T1 elapses, the user equipment gets back to the normal operation. Unless the radio link recovers until the first wait time expires, the user equipment declares the radio link failure and enters into the second phase.

In the second phase, the user equipment stands by for second wait time T2 until the radio link recovers. If the radio link fails to recover until the second wait time expires, the user equipment enters into an RRC idle state or may perform an RRC reestablishing process.

The RRC connection reestablishing process is a process of reestablishing the RRC connection in the RRC_CONNECTED state. Because the user equipment remains in the RRC_CONNECTED state, that is, does not enter into the RRC_IDLE state, the user equipment does not initialize all of its radio configurations (e.g., radio bearer configuration, etc.). Instead, the user equipment temporarily pauses (suspends) use of all the radio bearers except for SRB0 when starting the RRC connection reestablishing process. If the RRC connection reestablishing succeeds, the user equipment resumes use of the radio bearers that has been temporarily paused.

Figure 5:
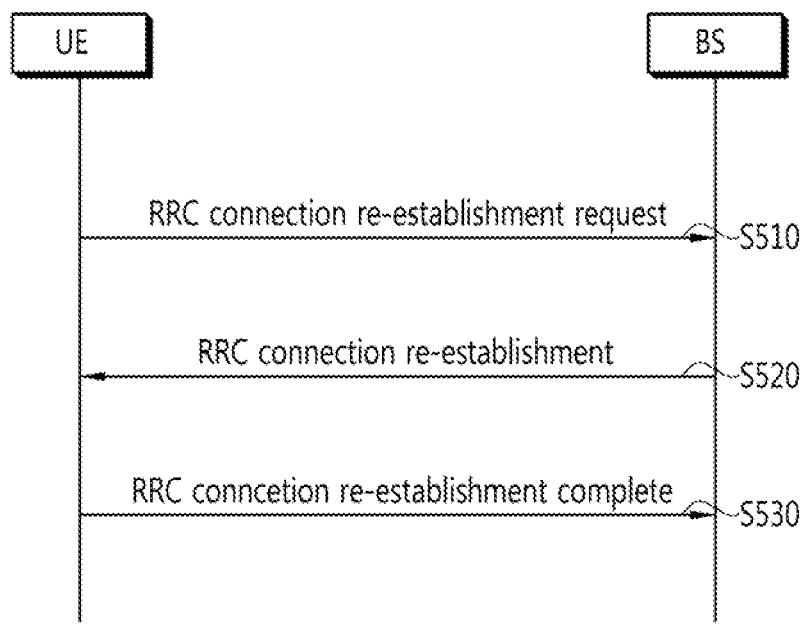
FIG. 5 is a flowchart illustrating a success of a connection reestablishing process.

FIG. 5 is a flowchart illustrating a success of a connection reestablishing process.

The user equipment performs cell selection and selects a cell. The user equipment receives system information to receive basic parameters for connection to the selected cell. The user equipment sends an RRC connection reestablishing request message to the base station (S510).

In case the selected cell is a cell having the context of the user equipment, that is, a prepared cell, the base station accepts the RRC connection reestablishing request from the user equipment and sends an RRC connection reestablishing message to the user equipment (S520). The user equipment forwards an RRC connection reestablishing complete message to the base station, thus leading the RRC connection reestablishing process to success (S530).

Figure 6:
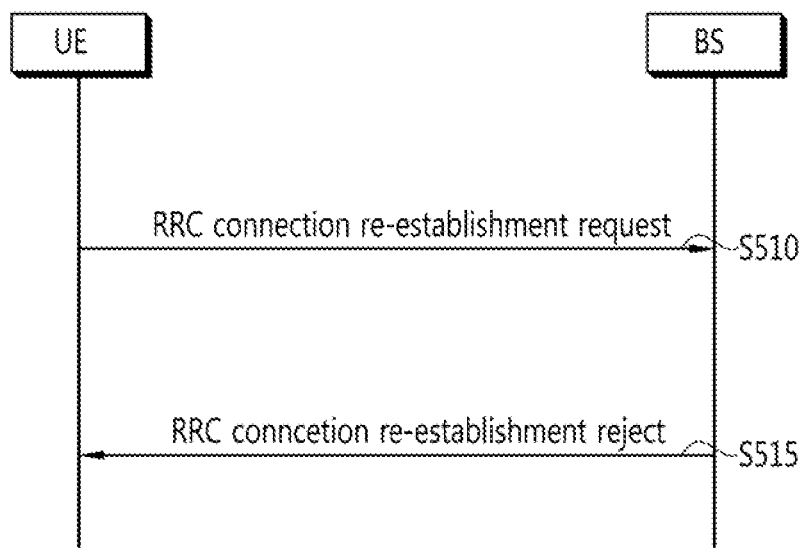
FIG. 6 is a flowchart illustrating a failure of a connection reestablishing process.

FIG. 6 is a flowchart illustrating a failure of a connection reestablishing process. The user equipment sends an RRC connection reestablishing request message to the base station (S510). If the selected cell is not the prepared cell, the base station sends an RRC connection reestablishing reject message to the user equipment in response to the RRC connection reestablishing request (S515).

ICIC (Inter-cell Interference Coordination) is now described.

ICIC is a task that operates radio resources to maintain control of inter-cell interference. The ICIC mechanism may be divided into frequency domain ICIC and time domain ICIC. ICIC includes multi-cell Radio Resource Management (RRM) functions that need consideration of information from the multi-cell.

An interfering cell is a cell that causes interference. The interfering cell is also referred to as aggressor cell.

An interfered cell is a cell that is interfered by the interfering cell. The interfered cell is also referred to as victim cell.

The frequency domain ICIC coordinates use of frequency domain resources (e.g., Resource Block (RB)) between multi-cells.

The time domain ICIC coordinates time domain resources (e.g., sub-frame) between multi-cells. For the time domain ICIC, OAM (Operations, Administration and Maintenance) configuration, which is called ABS (Almost Blank Subframe) pattern, may be used. In the interfering cell, the ABS is used to protect resources in the sub-frame of the interfered cell receiving strong inter-cell interference. The ABS is operated in the interfering cell, and the interfered cell utilizes the ABS for scheduling thereby coordinating interference from the interfering cell. The ABS is a sub-frame having reduced transmission power (or zero transmission power) over the physical channel or having decreased activity.

An ABS-based pattern is provided to the user equipment and restricts user equipment measurement. This is referred to as "measurement resource restriction." The ABS pattern refers to information indicating which sub-frame is ABS in one or more radio frames.

Depending on the measured cell (e.g., serving cell or neighboring cell) and measurement type (e.g., Radio Resource Management (RRM), Radio Link Monitoring (RLM), Channel State Information CSI)), three measurement resource restriction patters are present.

'ABS pattern 1' is used to restrict RRM/RLM measurement resources of the serving cell. Information on ABS pattern 1 may be provided from the base station to the user equipment when RB is configured/modified/released or when MAC/PHY configurations are modified.

'ABS pattern 2' is used to restrict RRM measurement resources of the neighboring cell operating at the same frequency as the serving cell. Accordingly, ABS pattern 2 may provide a list of neighboring cells to be measured, together with the pattern information, to the user equipment. ABS pattern 2 may be included in a measurement configuration for a measurement object.

'ABS pattern 3' is used to restrict resources for CSI measurement of the serving cell. ABS pattern 3 may be included in a message configuring CSI report.

For purposes of ICIC, two scenarios, CSG scenario and pico scenario, are being considered.

Figure 7:
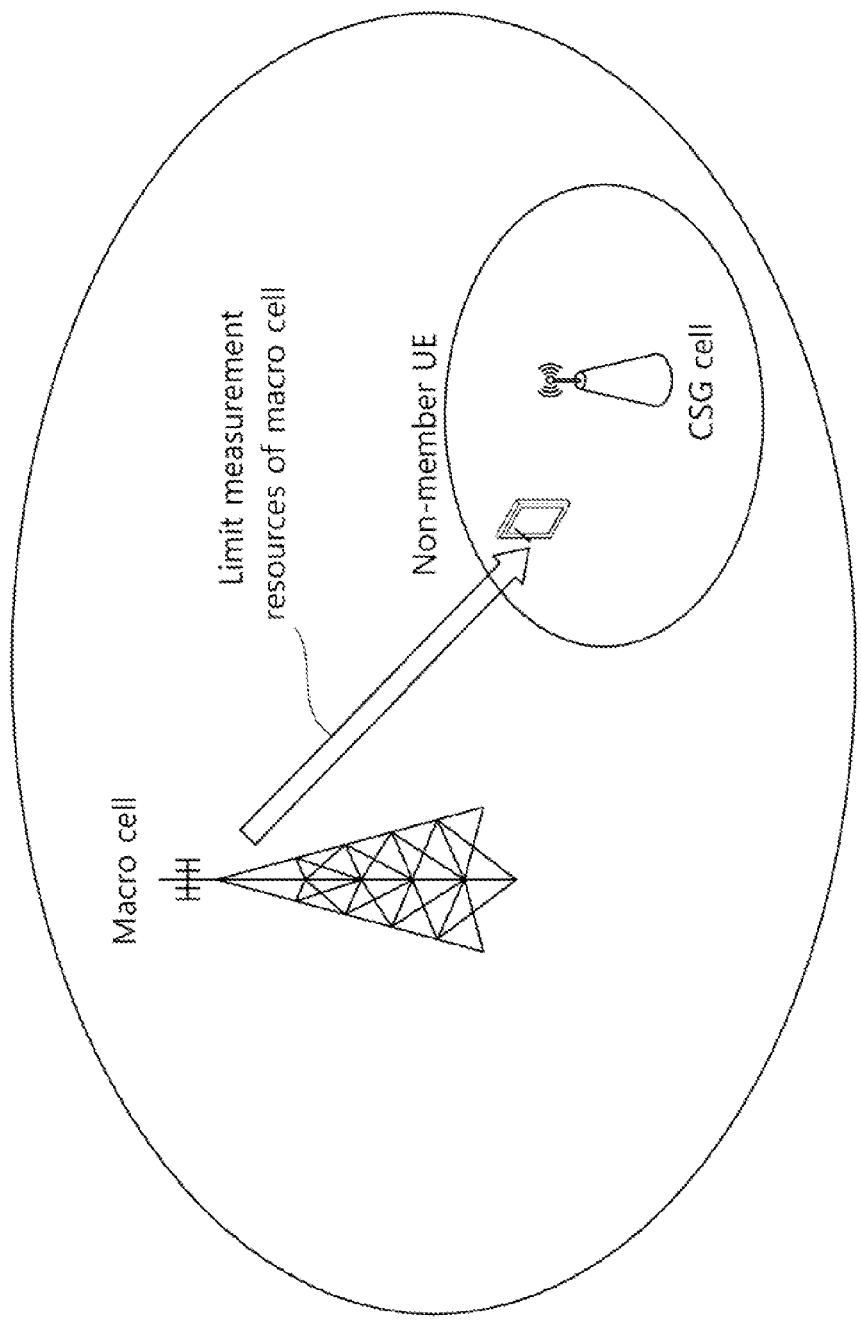
FIG. 7 shows an example of the CSG scenario.

FIG. 7 shows an example of the CSG scenario.

The CSG cell means a cell which only specific subscribers may access. The non-member user equipment is not a member of the CSG cell and is not allowed to access the CSG cell. A CSG cell that the user equipment cannot access is referred to as non-member CSG cell. The macro cell is a serving cell of non-member user equipment. The CSG cell wholly or partially overlaps the macro cell in light of coverage.

A main interference condition occurs when the non-member user equipment is positioned in close proximity to the CSG cell. In the point of view of the non-member user equipment, the CSG cell is an interfering cell, and the macro cell is an interfered cell. The time domain ICIC is used to allow the non-member user equipment to keep receiving a service in the macro cell.

In the RRC connected state, when finding that the non-member user equipment is under strong interference from the CSG cell, the network may configure a measurement resource restriction. Further, to facilitate mobility from the macro cell, the network may configure an RRM measurement resource restriction on the neighboring cell. If the user equipment is not strongly interfered from the CSG cell any more, the network may release the RRM/RLM/CSI measurement resource restrictions.

The user equipment may use a measurement resource restriction configured for RRM, RLM and CSI measurement. That is, the resources for RLM may be used in ABS, and measurement for RLM and CSI measurement may be conducted in the ABS.

The network may configure the CSG cell not to use low interference radio resources according to the configured measurement resource restriction. In other words, the CSG cell may not transmit or receive data in the ABS.

Figure 8:
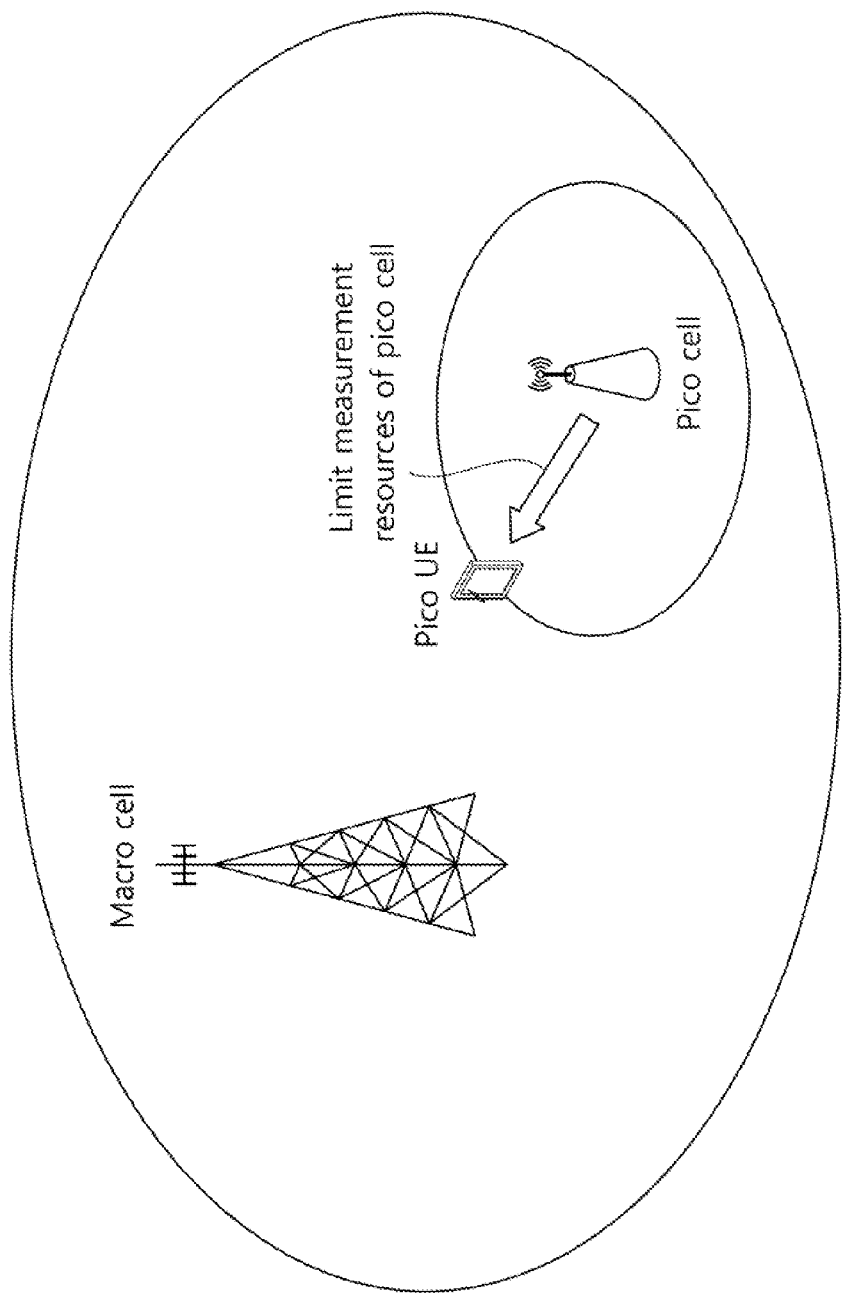
FIG. 8 shows an example of the pico scenario.

FIG. 8 shows an example of the pico scenario.

The pico cell is a serving cell of pico user equipment. The pico cell overlaps part or whole of the macro cell in light of coverage. The pico cell may generally have smaller coverage than that of the macro cell, but is not limited thereto.

A main interference condition takes place when the pico user equipment is placed at an edge of the pico serving cell. In the position of the pico cell, the macro cell is an interfering cell, and the pico cell is an interfered cell. The time domain ICIC is used for the pico cell to be able to keep receiving a service in the pico cell.

Upon finding that the pico user equipment is under strong interference from the macro cell, the pico cell may configure a measurement resource restriction on the corresponding user equipment.

The pico user equipment may use low interference radio resources based on the measurement resource restriction configured for RRM, RLM, and CSI measurement. In other words, the resources for RLM are used in the ABS, and measurement for RLM and CSI measurement may be conducted in the ABS. When the pico cell is strongly interfered by the macro cell, if the RRM/RLM/CSI measurement is fulfilled in the ABS, more correct measurement may be possible.

Further, if the user equipment using the macro cell as a serving cell performs measurement on the neighboring cell in the ABS, user equipment's mobility from the macro cell to the pico cell may be more easily done.

The user equipment performs RRM measurement such as Reference Signal Received Power (RSRP), Reference Signal Received Quality (RSRQ) and quality measurement such as Channel Quality Indicator (CQI) and path-loss measurement on the serving cell or neighboring cell. Further, the user equipment may conduct measurement objecting Radio Link Monitoring (RLM) to monitor connection with the serving cell.

Depending on an object the user equipment tries to perform measure on, a cell causing interference (interfering cell) and a cell damaged by the interference (victim cell) are determined.

In case the user equipment measures the serving cell, an intra-frequency neighboring cell having a strong signal, which is positioned near the user equipment, may act as interference in measuring the serving cell. In such case, the user equipment may be highly interfered by the neighboring cell in measuring the serving cell.

In case the user equipment measures an intra-frequency neighboring cell, signals from the serving cell and another intra-frequency neighboring cell may interfere with measurement on the intra-frequency neighboring cell. In such case, the user equipment may be highly interfered by the other neighboring cell having the serving frequency and the serving cell in measuring the neighboring cell.

When the serving cell supports restricted measurement through a measurement resource restriction configuration as if it applies an Almost Blank Subframe (ABS) pattern, the user equipment, in the situation where the shift (e.g., handover) of the user equipment to a neighboring cell is proper, may use the measurement resource restriction configuration applied by the serving cell for measuring the neighboring cell.

Meanwhile, as the user equipment approaches the coverage of an inaccessible neighboring cell (e.g., non-member CSG cell, non-member femto cell), the user equipment is severely interfered. To prevent such a situation that user equipment inaccessible to the corresponding neighboring cell cannot perform communication, as well as measurement, due to interference caused by the neighboring cell, the corresponding neighboring cell may support the restricted measurement as if it applies the measurement resource configuration. However, if the serving cell is not aware of whether the corresponding neighboring cell has configured the measurement resource restriction and/or what the measurement resource restriction information is, it cannot let the user equipment know the proper measurement resource restriction configuration. This applies well to an environment where non-member femto cell is present in the coverage of the macro cell. Since the macro cell and the femto cell do not have an X2 interface, the macro cell may not obtain measurement resource restriction information provided from the femto cell. Since the macro cell cannot support the restricted measurement for the service target user equipment, a problem may occur with smoothly providing services.

There may be suggested a method of the user equipment obtaining measurement resource restriction information of the neighboring cell and providing it to the serving cell so as to avoid the above-described interference problem. According to an embodiment of the present invention, as suggested hereinafter, the user equipment may determine that the measurement resource restriction information is needed and may announce it to the network. Hereinafter, a method is described with reference to the drawings, in which the user equipment determines the need for restricted measurement, reports it, and accordingly, performs restricted measurement so as to avoid interference. Although the inaccessible neighboring cell causes interference in the following embodiment, the present invention is not limited thereto and may be also applicable to a case where there is a general interfering cell that has predetermined coverage and causes interference. That is, in various embodiments, the inaccessible cell may be represented as a general interfering cell and vice versa.

Figure 9:
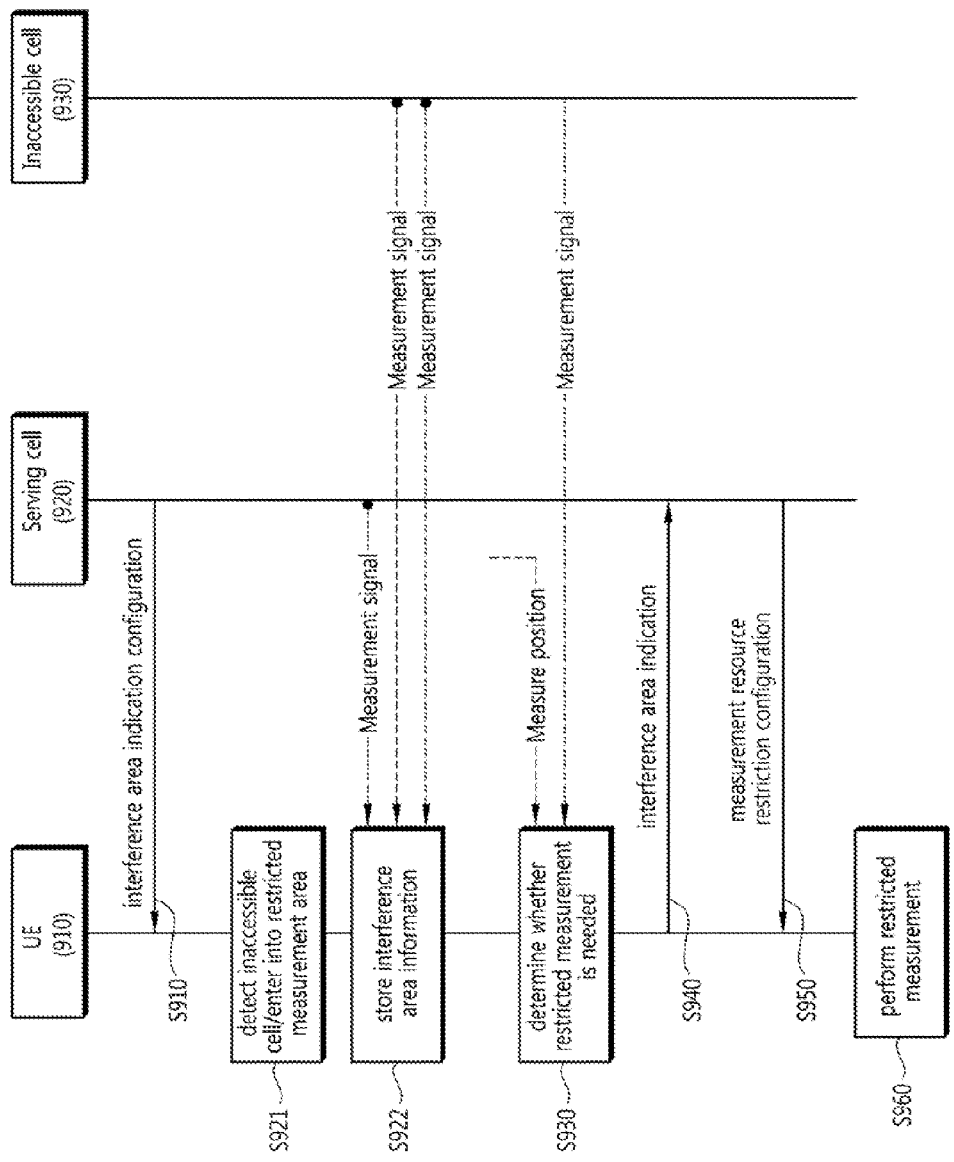
FIG. 9 is a flowchart illustrating a restricted measurement method by user equipment according to an embodiment of the present invention.

FIG. 9 is a flowchart illustrating a restricted measurement method by user equipment according to an embodiment of the present invention. FIG. 9 shows an example of a measurement method that may apply corresponding to high interference that may be caused by an inaccessible cell.

Referring to FIG. 9, the user equipment 910 receives an interference area indication configuration from the serving cell 920 (S910). The interference area indication configuration may include information indicating whether the user equipment 910 allows the serving cell 920 to be able to transmit an interference area indication. The interference area indication configuration may include an indication criterion that is a reference for the user equipment 910 to detect whether there is a situation where high interference occurs and to report it to the network and information on a geographical area requiring the restricted measurement.

When entering into an area requiring restricted measurement or detecting an inaccessible cell (S921), the user equipment 910 stores information of interference area (S922).

The user equipment 910 attempts to camp on in a specific cell to receive system information, and if determining that the corresponding cell is an inaccessible cell 930, the user equipment stores information of interference area including the specific information included in the system information. The interference area information stored by the user equipment includes identification information (e.g., cell ID) of the inaccessible cell and locational information of the user equipment upon the determination. In case the inaccessible cell 930 is operated with a measurement resource restriction used for restricted measurement configured, the measurement resource restriction information may be obtained and may be included in the interference area information. The measurement resource restriction information includes low-interference radio resource information, and the low-interference radio resource information may be specified by an ABS pattern.

The user equipment 910 determines whether restricted measurement is needed (S930). To determine whether the restricted measurement is needed, the user equipment 910 detects whether the user equipment 910 is positioned in a high-interfered area based on the position of the user equipment 910 or a result of the cell measurement.

If detecting a cell having the same identification information as identification information of an inaccessible cell included in the interference area information, the user equipment 910 may determine that it is currently positioned in the highly interfered area.

The user equipment 910 compares the current position with the locational information of the user equipment included in the interference area information, and if determining that it is positioned near the inaccessible cell 930, may determine that it is now placed in the highly interfered area.

The interference area indication configuration transmitted from the serving cell 920 may further include a cell identity range reserved for CSG. In such case, the user equipment 910, when detecting a cell in the corresponding identity range through measurement, may then determine that restricted measurement is required.

The user equipment 910, if detecting that it is positioned in an area requiring restricted measurement, may then determine that restricted measurement is required.

The user equipment 910, in case a difference between an RSRP measured value of the serving cell 920 and an RSRQ measured value is not less than a threshold value, may then determine that it is currently positioned in the highly interfered area.

The user equipment 910, if the measured value of the serving cell 920 is not more than a threshold value, may then determine that it is situated in the highly interfered area.

Specific methods of determining whether the user equipment is present in the highly interfered area or whether restricted measurement is required may be combined with each other.

In case it is determined that restricted measurement is required, the user equipment 910 transmits an interference area indication to the serving cell 920 (S940). The interference area indication includes information on an interfered cell that receives interference and accordingly requires restricted measurement and information on the interfering cell. In the case of the embodiment illustrated in FIG. 9, the interfered cell may be the serving cell 920, and the interfering cell may be the inaccessible neighboring cell 930.

The information on the interfered cell may include information indicating whether the measurement resource restriction applies to the serving cell or to the neighboring cell. The information on the interfered cell may include information relating to a frequency at which the restricted measurement is to be conducted. The information on the interfered cell, in case the user equipment is aware of the identity of the interfered cell, may then include the cell identity of the corresponding cell. The information on the interfered cell may include at least one or more of the detailed information.

In the embodiment shown in FIG. 9, the information on the interfered cell may include information indicating that the measurement resource restriction is to be applied to the serving cell, information indicating that the restricted measurement is to be applied to the frequency of the serving cell, and the identity of the serving cell.

The information on the interfering cell may include ABS pattern related information that is low-interference radio resource information that is being applied by the interfering cell. The information on the interfering cell may include information indicating whether the interfering cell is a serving cell or a neighboring cell. The information on the interfering cell may include information relating to a frequency at which interference is caused. The information on the interfering cell, in case the user equipment is aware of the identity of the interfering cell, may then include the cell identity. The information on the interfering cell may include information indicating that the corresponding cell is a non-member CSG cell. The information on the interfering cell may include information indicating that the interfering cell is a cell (e.g., pico cell) smaller in size than the macro cell.

In the embodiment illustrated in FIG. 9, the information on the interfering cell may further include ABS pattern related information that is being applied by the inaccessible cell 930, information indicating that the interfering cell is from a neighboring cell, frequency related information of the inaccessible cell 930, and the cell identity of the inaccessible cell 930. If the inaccessible cell 930 is a non-member CSG cell, the information on the interfering cell may further include information indicating that the interfering cell is the non-member CSG cell. In case the inaccessible cell 930 is a femto cell or pico cell, the information on the interfering cell may further include information thereon.

The user equipment 910, as a response to the interference area indication, receives a measurement resource restriction configuration from the serving cell 920 (S950). The measurement resource restriction configuration may include measurement resource restriction information included in the interference area indication. Accordingly, the user equipment 910 may obtain low-interference radio resource information that is a base for performing restricted measurement.

The user equipment 910 performs restricted measurement on the serving cell 920 and a neighboring cell including the inaccessible cell 930 based on the measurement resource restriction information containing the ABS related information (S960). The user equipment 910 may conduct measurement based on the ABS pattern as the low-interference radio resource information included in the measurement resource restriction information.

Figure 10:
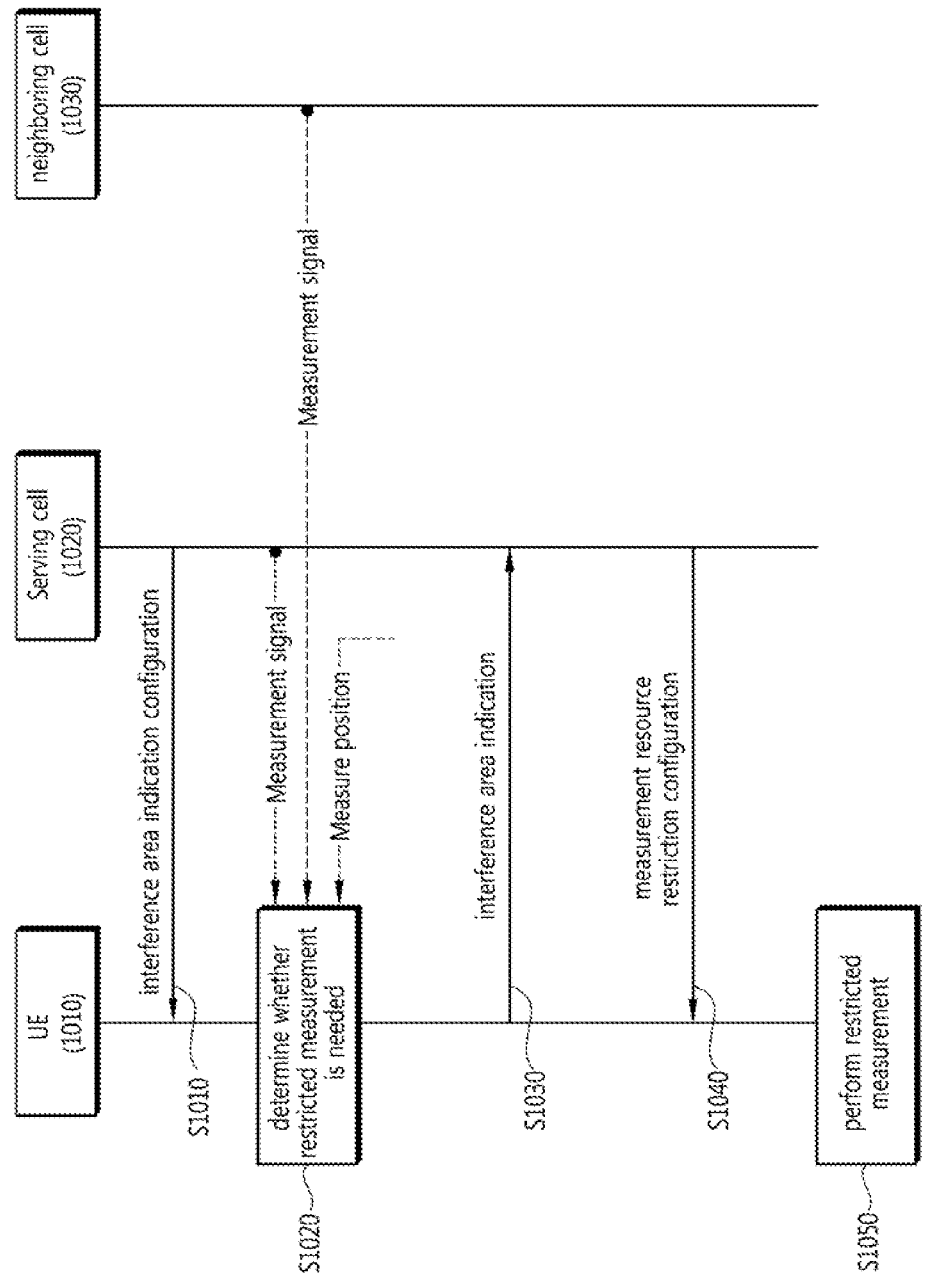
FIG. 10 is a flowchart illustrating a restricted measurement method by user equipment according to another embodiment of the present invention.

FIG. 10 is a flowchart illustrating a restricted measurement method by user equipment according to another embodiment of the present invention. The embodiment illustrated in FIG. 10 shows an example of a measurement method that may apply corresponding to high interference that may be caused by a serving cell.

Referring to FIG. 10, the user equipment 1010 receives an interference area indication configuration from the serving cell 1020. The interference area indication configuration includes indication criteria for the user equipment 1010 to detect whether there is a situation where high interference occurs and to report this to the network, information regarding a geo-graphical area requiring restricted measurement, and a list of at least one or more cells requiring the restricted measurement. The interference area indication configuration may further include an indicator indicating that high interference may occur to non-serving frequencies for the user equipment and a list of the corresponding frequencies. The indication criteria include a measurement quality threshold value for the user equipment to measure the neighboring cell and to determine whether restricted measurement is required based on a result of the measurement.

The user equipment 1010 detects a neighboring cell included in the cell list included in the interference area indication configuration or enters into an area requiring restricted measurement so as to determine whether restricted measurement is required (S1020).

If the neighboring cell 1030 measured by the user equipment 1010 is included in the cell list requiring the restricted measurement, the user equipment determines that restricted measurement is required.

If the quality of the neighboring cell 1030 measured by the user equipment 1010 is not less than a measurement quality threshold value included in the indication criteria, the user equipment determines that restricted measurement is required for the corresponding neighboring cell 1030.

If the user equipment 1010 is determined to be positioned in the area requiring restricted measurement, the user equipment determines that restricted measurement is required.

If the user equipment 1010 receives the interference area indication configuration including the indicator indicating that high interference may occur to the non-serving frequency, and conditions for measuring the corresponding non-serving frequency are met, the user equipment determines that restricted measurement is required when measuring the non-serving frequency. This, when the quality of the serving cell is not less than the inter-frequency measured threshold value, may apply to the case where the user equipment should start inter-frequency measurement.

In case restricted measurement is determined to be required, the user equipment 1010 transmits an interference area indication to the serving cell 1020 (S1030). The interference area indication includes information on an interfered cell that receives interference and needs restricted measurement and information on the interfering cell. In the case of the embodiment illustrated in FIG. 10, the interfered cell is the neighboring cell 1030, and the interfering cell is the serving cell 1020.

The information on the interfered cell may include information indicating whether measurement resource restriction is to apply to the serving cell or neighboring cell. The information on the interfered cell may include a cell identity of the interfered cell. The information on the interfered cell may include at least one or more of the detailed information.

In the embodiment illustrated in FIG. 10, the information on the interfered cell may include information indicating that the measurement resource restriction applies to the neighboring cell 1030 and the cell identity of the corresponding cell.

The information on the interfering cell may include a cell identity for the neighboring cell 1030 and RSRP measured values and RSRQ measured values for the serving cell 1020 and the neighboring cell 1030.

The user equipment 1010 receives, as a response to the interference area indication, a measurement resource restriction configuration from the serving cell 1020 (S1040). The restricted measurement configuration may include low-interference radio resource information configured by the serving cell 1020.

The user equipment 1010 performs restricted measurement on the serving cell 1020 and the neighboring cell 1030 based on the ABS pattern-related information included in the low-interference radio resource information (S1050).

In the embodiment illustrated in FIGS. 9 and 10, the measurement resource restriction configuration transmitted from the serving cell to the user equipment may be transmitted when the network, as well as the serving cell, may be aware of an object to which restricted measurement is to apply.

In the embodiment illustrated in FIGS. 9 and 10, when the serving cell needs additional information for configuring the restricted measurement resource restriction, the serving cell may request that the user equipment report the additional information. The additional information may include at least one or more of information on the measurement object cell, information on the interfering cell, and measurement resource restriction information. The serving cell may request transmission of the additional information, including information indicating specific additional information.

When receiving the request for reporting the additional information from the network, the user equipment, if having the requested information, then reports the corresponding information to the network. If the user equipment does not have the requested information, the user equipment may attempt to obtain the requested information. In case the requested additional information is measurement resource restriction information, the user equipment receives system information of a cell that causes or may cause interference, obtains corresponding information, and reports it to the serving cell.

The cell that causes or may cause interference may be indicated upon receiving a request for additional information from the network. Unless indicated, the user equipment may receive system information of a cell determined to be an interfering cell, obtain the requested information, and when transmitting the requested information to the network, the user equipment may include the identity of the target cell from which the system information has been obtained.

The user equipment, upon attempting to obtain the requested additional information, may terminate RLM (Radio Link Monitoring) for the serving cell.

If the neighboring cell does not send the requested additional information although the user equipment has received the system information of the neighboring cell to obtain the requested additional information, the user equipment reports the serving cell that there is no measurement resource restriction information.

When the network requests additional information, a maximum time that may be used for the user equipment to obtain the additional information may be set. If the user equipment fails to obtain the additional information within the maximum time until the maximum time elapses, the user equipment immediately reports the network that it has failed to obtain the additional information.

In the embodiment of the present invention as illustrated in FIGS. 9 and 10, the user equipment may be left in RRC_CONNECTED state. The user equipment, when left in the RRC_CONNECTED mode, may transmit a proximity indication message, a measurement report message, or other uplink messages, including therein information indicating that restricted measurement is required.

The user equipment that determines whether to perform restricted measurement and accordingly performs measurement may be left in RRC_IDLE state. In such case, the user equipment need enter into the RRC_CONNECTED state for exchanging messages with the serving cell. A measurement method by the user equipment for such purposes is now described with reference to drawings.

Figure 11:
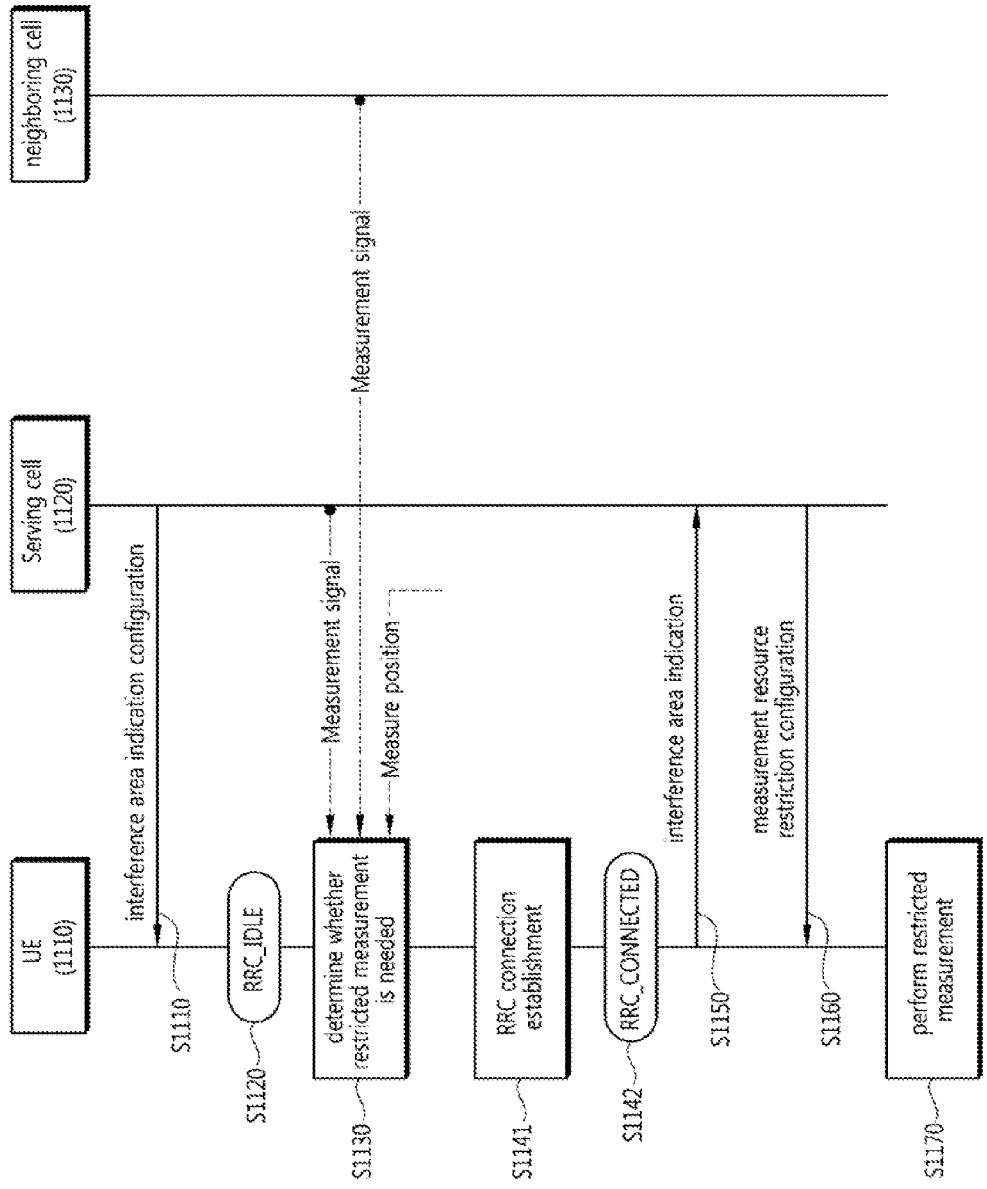
FIG. 11 is a view illustrating a method of performing measurement by user equipment according to another embodiment of the present invention.

FIG. 11 is a flowchart illustrating a restricted measurement method by user equipment according to another embodiment of the present invention.

Referring to FIG. 11, the user equipment 1110 receives an interference area indication configuration from the serving cell 1120 (S1110). The interference area indication configuration, depending on situation, may include such information as suggested in FIGS. 9 and 10.

The user equipment 1110 receives the interference area indication configuration from the serving cell 1120 and may enter into the RRC_IDLE state, then operating (S1120).

The user equipment 1110 detects a neighboring cell included in a cell list included in the interference area indication configuration or enters into an area that requires restricted measurement, thereby determining whether restricted measurement is required (S1130). Refer to the embodiments described above in connection with FIGS. 9 and 10 for a specific example of the user equipment determining whether restricted measurement is needed.

If the user equipment 1110 determines that restricted measurement is needed based on the measurement resource restriction information, the user equipment may enter into the RRC_CONNECTED state through an RRC connection establishing process (S1141) so as to inform it to the serving cell.

The user equipment may include an interference area indication indicating that restricted measurement is required in an RRC connection request message or RRC connection establishment complete message that is transmitted from the user equipment to the network during the RRC connection establishing process and may transmit it to the serving cell 1120.

Meanwhile, the user equipment 1110, after the RRC connection establishing process is ended, may include the interference area indication in a message transmitted over uplink and may transmit it (S1150). Refer to the embodiments described above in connection with FIGS. 9 and 10 for specific information included in the interference area indication transmitted from the user equipment 1110.

The user equipment 1110 receives, as a response to the interference area indication, a measurement resource restriction configuration from the serving cell 1120 (S1160). The measurement resource restriction configuration may include low-interference radio resource information including ABS pattern-related information. The ABS pattern-related information may be information relating to an ABS pattern configured by the interfering cell.

The user equipment 1110, when receiving the measurement resource restriction configuration, performs restricted measurement on the serving cell 1110 and the neighboring cell 1130 based on the received configuration.

A specific time section constituting the ABS pattern may have a form of a specific time section in a periodically repeating pattern. As an example, one pattern may consist of forty unit times each having a subframe length. Among the forty unit times, specific unit times expected to have less interference may be configured. The pattern may have a form that repeats overtime.

Further, the low-interference radio resource may be a specific frequency section that is less infected from the interfering cell. The specific frequency section may be a subframe which is suppressed by the interfering cell from being transmitted as possible. The specific frequency section may be a periodic frequency section in an uplink bandwidth.

In FIGS. 9 to 11, the restricted measurement performed by the user equipment includes measuring signals by using a time section or frequency that allows the interfering cell to minimize transmission and reception of radio signals. The user equipment, upon performing restricted measurement, may conduct RRM measurement such as RSRP or RSRQ, measurement on the channel status information such as CQI, and measurement on path loss.

In the restricted measurement method according to an embodiment of the present invention, the user equipment determines whether restricted measurement is required based on the measurement resource restriction information and reports it to the network (serving cell), and the network applies a proper measurement configuration to the user equipment. The user equipment determines, as necessary, what information is necessary for a proper measurement configuration of the network, directly obtains it, and may provide it to the network, so that the network may allow the user equipment to effectively apply the measurement resource restriction configuration. The user equipment may punctually receive an effective measurement resource restriction configuration from the network, thus resulting in a result of the measurement being reported with more accuracy. Accordingly, the quality of services provided to the user equipment may be enhanced.

Figure 12:
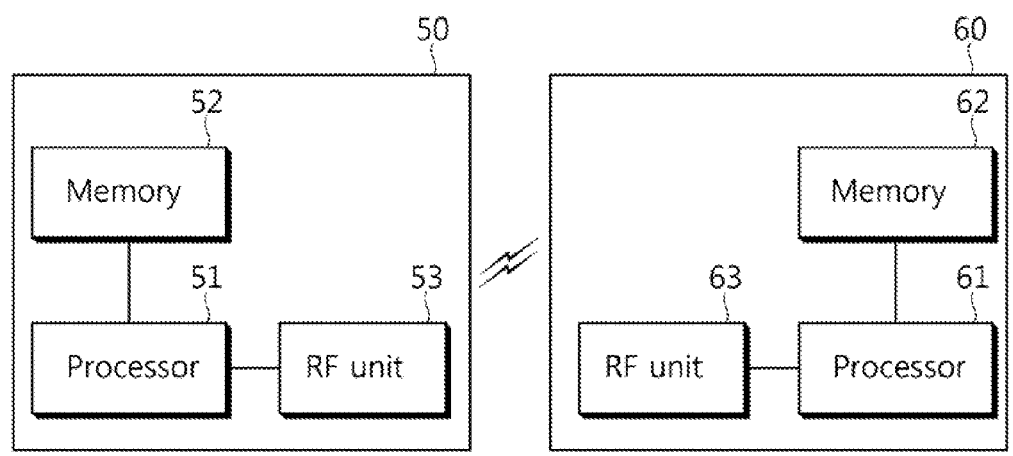
FIG. 12 is a block diagram illustrating a wireless communication system in which an embodiment of the present invention is implemented.

FIG. 12 is a block diagram illustrating a wireless communication system in which an embodiment of the present invention is implemented.

The base station 50 includes a processor 51, a memory 52, and an RF (Radio Frequency) unit 53. The memory 52 is connected to the processor 51 and stores various information for driving the processor 51. The RF unit 53 is connected to the processor 51 and transmits and/or receives radio signals. The processor 51 implements suggested functions, procedures, and/or methods. The operation of the base station 50 configuring a cell in the embodiments illustrated in FIGS. 7 to 9 may be implemented by the processor 51.

The user equipment 60 includes a processor 61, a memory 62, and an RF unit 63. The memory 62 is connected to the processor 61 and stores various information for driving the processor 61. The RF unit 63 is connected to the processor 61 and transmits and/or receives radio signals. The processor 61 implements suggested functions, procedures, and/or methods. The operation of the user equipment 60 in the embodiments illustrated in FIGS. 9 to 11 may be implemented by the processor 61.

The processor may include an ASIC (Application-Specific Integrated Circuit), other chipsets, logic circuits and/or data processing devices. The memory may include a ROM (Read-Only Memory), a RAM (Random Access Memory), a flash memory, a memory card, a storage medium and/or other storage devices. The RF unit may include a baseband circuit for processing radio signals. When the embodiments are implemented in software, the above-described schemes may be embodied in modules (procedures, functions, etc.) performing the above-described functions. The modules may be stored in the memory and may be executed by the processor. The memory may be positioned in or outside the processor and may be connected to the processor by various known means.

Although in the above-described exemplary systems, methods are described based on flowcharts including a series of steps or blocks, the present invention is not limited to the order of the steps, and some steps may be performed in a different order of other steps or simultaneously with other steps. It will be understood by one of ordinary skill that one or more steps in a flowchart may be deleted without affecting the scope of the invention.

The invention claimed is:

1. A method of performing measurement by user equipment in a wireless communication system, the method comprising:
receiving, from a serving cell, an interference area indication configuration including information allowing transmission of an interference area indication of the user equipment;
finding an interfering cell;
obtaining interference area information by the interfering cell,
wherein the interference area information includes pattern information of an ABS (Almost Blank Subframe) that is operated by the interfering cell and that is a section where interference is minimized;
determining whether restricted measurement is required;
when the restricted measurement is determined to be required, transmitting, to the serving cell, an interference area indication indicating that the restricted measurement is required;
receiving a measurement resource restriction configuration in response to the interference area indication; and
performing measurement based on the measurement resource restriction configuration.

2. The method of claim 1, wherein the interfering cell configures and operates a low-interference radio resource to transmit and receive a radio signal.

3. The method of claim 1, wherein the interference area indication includes at least one of information on an interfered cell that is an object of the restricted measurement and information on the interfering cell.

4. The method of claim 3, wherein the information on the interfering cell includes information indicating a case where the interfering cell is inaccessible and the ABS pattern information.

5. The method of claim 4,
wherein the measurement resource restriction configuration includes the ABS pattern information, and
wherein performing measurement based on the measurement resource restriction configuration includes performing the restricted measurement based on the ABS pattern information.

6. The method of claim 1,
wherein the interference area information includes locational information indicating a position of the user equipment when the interfering cell is detected, and
wherein if after the interference area information is obtained, the position of the user equipment is within a predetermined range from a position indicated by the positional information, it is determined that the restricted measurement is required.

7. The method of claim 1, wherein the interference area indication configuration includes at least one of indication criterion information that is a reference for determining a situation where high interference occurs and information on an area where the restricted measurement is required.

8. The method of claim 7, wherein if the user equipment is positioned in the area where the restricted measurement is required, it is determined that the restricted measurement is required.

9. The method of claim 8, wherein if the occurrence of the high interference is detected based on the indication criterion information, it is determined that the restricted measurement is required.

10. The method of claim 1,
wherein the interference area information includes a cell identity of the interfering cell, and
wherein when detecting a cell having the same identity as the cell identity, determining that the restricted measurement is required.

11. An apparatus of performing measurement in a wireless communication system, the apparatus comprising:
an RF (Radio Frequency) unit transmitting and receiving a radio signal; and
a processor connected to the RF unit, wherein the processor is configured to:

receive, from a serving cell, an interference area indication configuration including information that is a reference for determining whether restricted measurement is required;
find an interfering cell;
obtain interference area information by the interfering cell,
wherein the interference area information includes pattern information of an ABS (Almost Blank Subframe) that is operated by the interfering cell and that is a section where interference is minimized;
determine whether the restricted measurement is required based on the interference area indication configuration;
when the restricted measurement is determined to be required, transmit, to the serving cell, an interference area indication indicating that the restricted measurement is required;
receive a measurement resource restriction configuration in response to the interference area indication; and
perform measurement based on the measurement resource restriction configuration.

12. The apparatus of claim 11, wherein the interference area indication includes at least one of information on an interfered cell that is an object of the restricted measurement and information on the interfering cell.

13. The apparatus of claim 12, wherein the information on the interfering cell includes information indicating a case where the interfering cell is inaccessible and the ABS pattern information.

14. The apparatus of claim 13,
wherein the measurement resource restriction configuration includes the ABS pattern information, and
wherein the measurement performed based on the measurement resource restriction configuration includes performing the restricted measurement based on the ABS pattern information.

* * * * *